United States Patent [19]

Kurz et al.

[11] Patent Number: 4,919,913
[45] Date of Patent: Apr. 24, 1990

[54] PROCESS FOR THE PRODUCTION OF SOLAR SILICON

[75] Inventors: Günter Kurz, Duesseldorf; Martin Abels, Krefeld; Ingo Schwirtlich, Krefeld; Peter Woditsch, Krefeld, all of Fed. Rep. of Germany

[73] Assignee: Bayer Aktiengesellschaft, Leverkusen-Bayerwerk, Fed. Rep. of Germany

[21] Appl. No.: 375,281

[22] Filed: Jul. 3, 1989

[30] Foreign Application Priority Data

Jul. 15, 1988 [DE] Fed. Rep. of Germany ....... 3824065

[51] Int. Cl.$^5$ ........................ C01B 33/02; C01F 3/00
[52] U.S. Cl. .................................. 423/348; 423/349; 423/350; 423/495; 423/DIG. 12
[58] Field of Search ............... 423/348, 349, 350, 495, 423/DIG. 12; 75/0.5 C

[56] References Cited
U.S. PATENT DOCUMENTS 4,525,334 6/1985 Woditsch et al. .................. 423/349

FOREIGN PATENT DOCUMENTS 0001943 5/1979 European Pat. Off. ............ 423/349
123100 of 1984 European Pat. Off. . -
874137 of 1949 Fed. Rep. of Germany .
3310828 9/1984 Fed. Rep. of Germany ...... 423/349

OTHER PUBLICATIONS

Chemical Abstracts, Bond 57, Nr. 3, Seite 1962, Zusammenfassung Nr. 3076; 3077a; S. Yoshizawa et al., & Kogyo Kagaku Zasshi 64, 1347-1350 (1961): T. Kat. D. A.
Seventh E. C. Photovolatic Solar Energy Conference held at Sevilla, Spain, 27-31 Oktober, 1986, D. Reidel Publ. Co., Dardrecht, NL; 1. A. Schwertbek et al.

*Primary Examiner*—John Doll
*Assistant Examiner*—Lori F. Cuomo
*Attorney, Agent, or Firm*—Connolly and Hutz

[57] ABSTRACT

The process for producing silicon suitable for use in solar cells is improved by reacting a gaseous silicon compound with aluminum wherein a finely dispersed molten surface of pure aluminum or an aluminum/silicon alloy is intensively contacted with the gaseous silicon compound during the reaction.

9 Claims, No Drawings

PROCESS FOR THE PRODUCTION OF SOLAR SILICON

This invention relates to a process for the production of silicon by reaction of gaseous silicon compounds having the general formula $SiH_nX_{4-n}$, where X is halogen and n may assume a value of from 0 to 3, with aluminium.

BACKGROUND OF THE INVENTION

For the commercial utilization of solar energy by photovoltaic current generation in the terrestrial sector, silicon is at the present the only suitable semiconductor material both for economic and for ecological reasons. Silicon originating from semiconductor silicon, of which the production process is known from semiconductor technology has hitherto been almost exclusively used.

Whereas material costs are of minor importance in the semiconductor industry, they are crucially important in photovoltaics because the electrical output of a solar cell is proportional to its area and hence to the amount of material involved.

Photovoltaics can contribute towards solving terrestrial energy problems when solar cells capable of competing with conventional energy sources in price and efficiency have been successfully developed. Accordingly, a basic prerequisite for the utilization of solar energy on a large scale is an economical process for the production of silicon which satisfies the solar silicon requirements.

Various processes have been proposed for the production of solar silicon, including:

1. The reduction of high-purity quartz sand with high-purity carbon (DE-A 3 013 319),
2. The purification of metallurgical silicon (DE-A 2 623 413), the reduction of $SiO_2$ with aluminium (EP-A 0 029 182),
3. The reduction of $SiF_4$ or $SiCl_4$ with sodium (Mater. Res. Bull. 16(4), 437 (1981); DE-A 2 800 254),
4. The reduction of $SiCl_4$ with zinc (U.S. Pat. No. 3,012,862) and
5. The reduction of $SiCl_4$ with aluminium at 360° C. (P. Pascal, Nouveau traite de chimie minerale, Vol. VIII, No. 2, Silicon, page 275).

Economically, these processes are not satisfactory for the production of a silicon for solar cells on an industrial scale. EP-A-0 123 100 describes a process in which solid aluminium is reacted with Si-halides at 500° to 660° C. A pure silicon suitable for solar cells is economically obtained by this process.

The reaction of liquid aluminium with $SiCl_4$ at 750° to 1000° C. is described by Yoshizawa et al (Kagyo kagaku Zasshi 64 (1961), 1347 to 1350)Silicon tetrachloride is passed over a bath of liquid aluminium at the reaction temperature. At most 50% by weight silicon with adhering aluminium is obtained. The silicon was isolated by dissolving the residual aluminium in acid. This method is not practicable for an economic process. Since the diffusion of dissolved silicon in the molten aluminium $(D = 10^{-5}$ cm$^2$/S)is the speed-determining factor in the reaction described by Yoshizawa et al, the reaction times are relatively long. A complete conversion of the aluminium in an economically reasonable time does not occur.

The reaction is largely determined by the temperature, the atmosphere and the $SiCl_4$ throughput. The disadvantages mentioned above persist despite the described optimization.

Accordingly, the object of the present invention was to provide an economical process without any of the disadvantages described above.

BRIEF DESCRIPTION OF THE INVENTION

It has now surprisingly been found that substantially quantitative conversion can be economically obtained if the process is carried out in a way which guarantees intensive contact between as large an aluminium surface as possible and the reaction gas. Thus, the invention relates to an improved process for the production of silicon suitable for use in solar cells by reacting a gaseous silicon compound with the molten surface of finely dispersed particles of pure aluminium or an aluminium/silicon alloy in intensive contact with the gaseous silicon compound during the reaction.

DETAILED DESCRIPTION OF THE INVENTION

Accordingly, the present invention relates to a process for the production of silicon by reaction of gaseous silicon compounds having the general formula $$SiH_nX_{4-n}$$

where X is halogen and n may assume a value of 0 to 3, with aluminium, a finely dispersed molten surface consisting of pure aluminium or of an Al-Si alloy being intensively contacted with the gaseous silicon compound during the reaction. In one preferred embodiment of the process according to the invention, the intensive contact is obtained by fine dispersion of the molten aluminium in a space containing the gaseous silicon compound. Particularly good results are obtained when the molten surface measures at least $10^{-3}$ m$^2$/g. Conversely, $SiCl_4$ gas may of course also be finely dispersed in molten aluminium. To obtain a quantitative conversion, intensive contact has to be established by fine dispersion of the gaseous silicon compound in the melt. According to the invention, this may be achieved by setting the maximum gas bubble distribution in the melt at a gas bubble size of at most 5 mm. In one preferred embodiment of the process according to the invention, the aluminium is reacted in the form of fine droplets and more preferably in the form of aluminium droplets smaller than 500 μm. The product obtained in the reaction of aluminium droplets is a silicon "grit" of comparable grain size which handles well. The molten aluminium is converted into droplet form by known methods (A. Lowley, International Journal of Powder Metallurgy and Powder Technology, Vol. 13 (3), July, 1977), for example by spraying the melt through one- or two-component nozzles or by dispersing the melt by centrifugal forces. In the process according to the invention, the dispersion process is directly carried out in a silicon halide atmosphere, the reaction taking place. The quantitative conversion required depends on the particle size of the aluminium melt, the residence time and the silicon halide gas concentration. The preferred temperature in the process according to the invention is above 660° C. and more preferably between 700° and 1000° C.

The residence time may be adjusted through the flight or descent path of the melt particles in the reactor. The particle size of the melt is determined by the parameters of the dispersion process. In the spray method, it may be adjusted through the inlet pressure and the choice of nozzle.

The process according to the invention is not confined to the use of a certain silicon halide, halosilane, silane or any two- or multi-component mixture thereof, nor is it confined to their production by any one chemical or physical process. In the context of the invention, halides are understood to be fluorine, chlorine, bromine and iodine. The gaseous silicon compound may be delivered to the reaction in a pure atmosphere or together with inert gases not participating in the reaction, such as for example Ar, $SF_6$. The silicon compound is preferably used in excess.

In one particularly preferred embodiment of the invention, silicon tetrachloride $SiCl_4$ is used as the silicon compound. In the reaction of $SiCl_4$ purified by distillation with pure aluminium, pure silicon is formed in addition to pure $AlCl_3$. This variant can be made into an elegant recycle version (EP-A 0 123 100) of the process according to the invention. The advantage of the process according to the invention over EP-A 0 123 100 in this regard is that high-purity aluminium obtained by electrolysis of pure $AlCl_3$ may be directly returned to the process in molten form. The saving of one process step, namely conversion of the aluminium into a finely divided solid form, affords a considerable economic and quality advantage in regard to product purity. Production capacity is considerably increased in relation to EP-A 0 123 100.

The following Examples are intended to illustrate the invention without limiting it in any way.

EXAMPLE 1

In an apparatus heated to 800° C. consisting of a 100 liter quartz glass vessel with gas inlet and outlet tubes, approx. 0.3 kg molten aluminium is sprayed through a spray nozzle installed therein (nozzle diameter 1 mm) into an $SiCl_4$ atmosphere in 10 s at an inlet pressure of 4 bar. The supply of purified $SiCl_4$ heated to 600° C. is regulated in such a way as to guarantee a stoichiometric $SiCl_4$ excess of 200%. The aluminium used reacts almost completely to silicon with formation of $AlCl_3$. The $AlCl_3$ sublimated off is removed with the excess $SiCl_4$ and condensed in suitable receivers. The silicon formed is removed as granulate (grain diameter between 100 and 800 μm) at the reactor exit. The impurities in the silicon are determined by the impurities in the aluminium used. Where ultra-pure aluminium is used, a high-purity silicon is directly obtained.

EXAMPLE 2

100 g molten aluminium are introduced into a quartz vessel at 700° C. The vessel is provided with an inlet tube of quartz glass. A total of 1200 g $SiCl_4$ is introduced into the melt through this inlet tube over a period of 1 hour, the temperature rising continuously to 1460° C. The off-gases are removed through an outlet into a condensation apparatus. After cooling, 40 g high-purity silicon are obtained in the form of a regulus.

What is claimed is:

1. In an improved process for the production of silicon by reacting aluminum with gaseous silicon compounds having the formula $$SiH_nX_{4-n}$$

where X is halogen and n is a value from 0 to 3, the improvement comprising intensively contacting the molten surface of dispersed particles of pure aluminum or an Al-Si alloy with the gaseous silicon compound during the reaction.

2. A process is claimed in claim 1, wherein the intensive contact is by providing a dispersion of particles of molten aluminum in a space containing the gaseous silicon compound.

3. A process as claimed in claim 1 wherein the molten surface measures at least $10^{-3}$ m²/g aluminum.

4. A process as claimed in claim 1 wherein the reaction is at temperatures above 660° C.

5. A process as claimed in claim 4 wherein the reaction is at a temperature from 700° to 1000° C.

6. A process as claimed in claim 1 wherein molten aluminum is converted into droplet form by spraying.

7. A process as claimed in claim 6 wherein the droplets are smaller than 500 μm.

8. A process as claimed in claim 7 wherein the droplet form of the molten aluminum is obtained by centrifugal forces.

9. A process for the production of silicon which comprises spraying atomized molten aluminum into a chamber with an atmosphere of gaseous silicon halide in a stoichiometric excess of at least 200% of that required for reaction with the molten aluminum whereby the aluminum reacts substantially completely with the silicon halide, by-product $AlCl_3$ is sublimed off along with excess silicon halide and the silicon product is removed as a granulate.

* * * * *